(12) United States Patent
Takamura et al.

(10) Patent No.: US 7,153,235 B2
(45) Date of Patent: Dec. 26, 2006

(54) RUNNING CONTROL DEVICE FOR INDUSTRIAL VEHICLE

(75) Inventors: Masayuki Takamura, Tochigi (JP); Takeo Kato, Kanagawa (JP); Takayuki Mori, Kanagawa (JP)

(73) Assignees: Komatsu Forklift Co., Ltd., Oyama (JP); Komatsu Ltd., Tokyo (JP)

(*) Notice: Subject to any disclaimer, the term of this patent is extended or adjusted under 35 U.S.C. 154(b) by 116 days.

(21) Appl. No.: 10/800,743

(22) Filed: Mar. 16, 2004

(65) Prior Publication Data

US 2004/0185986 A1    Sep. 23, 2004

(30) Foreign Application Priority Data

Mar. 17, 2003   (JP) .............................. 2003-071268

(51) Int. Cl.
*B60T 11/10* (2006.01)
(52) U.S. Cl. .................. 477/172; 477/170; 477/171; 477/173; 477/174; 477/175; 477/180; 477/92; 477/71; 477/73
(58) Field of Classification Search ............... 477/92, 477/73, 75, 71, 170, 171, 172, 173, 174, 477/175, 180, 107
See application file for complete search history.

(56) References Cited

U.S. PATENT DOCUMENTS

| | | | | |
|---|---|---|---|---|
| 5,456,333 A | * | 10/1995 | Brandt et al. | 180/336 |
| 5,692,990 A | * | 12/1997 | Tsukamoto et al. | 477/93 |
| 6,162,146 A | * | 12/2000 | Hoefling | 477/73 |
| 6,551,212 B1 | * | 4/2003 | Skinner et al. | 477/73 |

FOREIGN PATENT DOCUMENTS

JP         A-06-27190         9/1994

* cited by examiner

*Primary Examiner*—Richard M. Lorence
*Assistant Examiner*—David D. Le
(74) *Attorney, Agent, or Firm*—Posz Law Group, PLC; R. Eugene Varndell, Jr.

(57) ABSTRACT

The present invention provides a running control device for an industrial vehicle that has superior driving operability and that allows easy starting and stopping on road surfaces that have sloped or stepped surface. The running control device for an industrial vehicle includes an engine, a sensor that detects an operation amount of an accelerator member, a transmission that has a forward clutch and reverse clutch, a brake that applies braking to the vehicle, and a controller. The controller simultaneously controls the engine revolutions, the engaging force of the forward clutch and reverse clutch and the braking force of the brake in accordance with the operation amount.

6 Claims, 6 Drawing Sheets

RUNNING CONTROL DEVICE FOR INDUSTRIAL VEHICLE

BACKGROUND OF THE INVENTION

1. Field of the Invention

The present invention relates to a running control device for an industrial vehicle such as a forklift or the like.

2. Description of the Related Art

Industrial vehicles such as forklifts, wheel loaders, bulldozers and the like generally comprise accelerator means such as an accelerator pedal, accelerator lever or the like used to control the engine revolutions, a clutch pedal used to operate the forward clutch and reverse clutch of a transmission that transmits the rotational torque of the engine to the drive shaft, and a brake pedal and brake lever which are used to operate brakes that apply braking to the vehicle. Conventionally, in industrial vehicles with such construction, cases where so-called starting on a slope is performed, or in cases where the vehicle is started into motion in a state in which the vehicle wheels are riding over a step part as shown in FIG. 8, it is necessary to perform the simultaneous operation of the brake lever, clutch pedal and accelerator means. Specifically, the following operation is performed: namely, the accelerator pedal is depressed a little at a time while the brake lever is pulled, and the depressed clutch pedal is gradually released so that the engine driving torque is transmitted to the driving wheels a little at a time while the clutch is engaged; then, when a driving torque that is equal to or greater than a specified value has been transmitted, the break lever is completely released, and the vehicle is started into motion while the engine revolutions are increased by means of the accelerator pedal.

However, the following problems occur in the abovementioned prior art.

In the case of industrial vehicles such as forklifts and the like, it is often necessary to perform load transporting work on sloping road surfaces or step parts on road surfaces. In such cases, unless the vehicle is started into motion at a very low speed or stopped at a very low speed, there is a danger of collapse or spilling of the load or the like. In order to prevent slipping in the opposite direction in the case of uphill starting on a sloping road surface or step part on the road surface as described above, three operations, i.e., the operation of the accelerator pedal, brake lever and clutch pedal, must be performed simultaneously. Accordingly, operation is extremely difficult, so that the problem of a deterioration in driving operability arises. Furthermore, such an operation of starting the vehicle into motion at a very low speed or stopping the vehicle in place at a very low speed (so that there is no collapse or spilling of the load) requires a considerable amount of experience. Accordingly, there is a strong demand to make it possible to perform the abovementioned operation easily, without any need for experience.

SUMMARY OF THE INVENTION

The present invention was devised with a focus on the abovementioned problem points; it is an object of the present invention to provide a running control device for an industrial vehicle with superior driving operability that allows easy starting into motion or stopping in place on road surfaces that have a slope or step parts.

In order to achieve the abovementioned object, a first aspect of the present invention provides a running control device for an industrial vehicle comprising: an engine; an operation amount detection sensor which detects an operation amount of accelerator means for controlling engine revolutions; a transmission which has a forward clutch and reverse clutch that respectively switch a direction of travel of the vehicle to a forward direction and reverse direction, and which transmits a driving torque of the engine to driving wheels via the forward clutch or reverse clutch; a brake which applies braking to the vehicle; and a controller which controls an engaging force of the forward clutch and reverse clutch and a braking force of the brake during the running of the vehicle, and which controls the engine revolutions on the basis of the operation amount detected by the operation amount detection sensor; wherein the controller simultaneously controls the engine revolutions, the engaging force of the forward clutch and reverse clutch and the braking force of the brake, on the basis of the operation amount detected by the operation amount detection sensor.

In the first aspect of the invention, since the braking force of the brake, the engaging force of the clutch and the engine revolutions are simultaneous controlled merely by controlling the operation amount using the accelerator means, the operability during starting, especially the operability in the case of starting into motion in a state in which the vehicle wheels are riding on an inclined surface, such as starting into motion on a sloping road or the like, is extremely good. Furthermore, as a result of the simultaneous control of the braking force of the brake, engaging force of the clutch and engine revolutions, starting into motion at a very low speed, traveling at a very low speed and stopping at a very low speed can be accomplished by controlling only the operation amount. Accordingly, starting into motion, traveling and stopping can easily be accomplished without causing any collapse of the load or the like. As a result, driving operation of the vehicle is facilitated, and the workability obtained using this industrial vehicle can be greatly improved.

In a second aspect of the present invention, based on the first aspect of the invention, the device is constructed so that a vehicle speed sensor that detects the vehicle speed is provided, and the abovementioned controller further stops, on the basis of the operation amount, the simultaneous control of the engine revolutions, the engaging force of the forward clutch and reverse clutch and the braking force of the brake when the vehicle speed detected by the vehicle speed sensor exceeds a specified first reference speed.

In the second aspect of the invention, starting of the vehicle into motion can be easily and reliably accomplished, and the vehicle speed can be reliably increased, by simultaneous control of the engine revolutions, engaging force of the forward clutch and reverse clutch and braking force of the brake while the vehicle speed is in the process of rising to a specified first reference speed or greater. Then, once the vehicle speed has risen, a shift can be made to a more mobile running control mode such as vehicle speed control according to the operation amount or the like after the simultaneous control of the braking force of the brake and the engaging force of the clutch is stopped.

In a third aspect of the present invention, based on the first or second aspect of the invention, the device is constructed so that the controller varies the command value curves of the engine revolutions, the engaging force of the forward clutch and reverse clutch and the braking force of the brake that correspond to the operation amount, so that the vehicle driving force generated by the engine revolutions, engaging force of the forward clutch and reverse clutch and braking force of the brake that correspond to the operation amount increases when the operation amount exceeds a specified value, and determines and outputs the respective command values for the engine revolutions, the engaging force of the forward clutch and reverse clutch and the braking force of the brake that correspond to the operation amount, on the basis of the command value curves following the variation.

In the third aspect of the invention, when operation is performed at an operation amount that is equal to or greater than a specified value, even if this operation amount is constant, i.e., even if the operator operates the vehicle while maintaining the same operation amount, the command value curves corresponding to the operation amount are varied so that vehicle driving force generated by the engine revolutions, the engaging force of the forward clutch and reverse clutch and the braking force of the brake that correspond to this operation amount increases; accordingly, the vehicle driving force gradually increases so that the vehicle is eventually started into motion. Consequently, regardless of the conditions of the road surface or sloping road surface that may be involved, the operator can always start the vehicle into motion by operating the vehicle at substantially the same operation amount, so that driving of the vehicle can always be performed with the same operating feeling, thus improving the operability.

In a fourth aspect of the present invention, based on the third aspect of the invention, the device is constructed so that the controller stops the variation of the command value curves when the vehicle speed exceeds a specified second reference speed, holds the final command value curves, and determines the respective command values on the basis of the final command value curves.

In the fourth aspect of the invention, when the vehicle speed exceeds a specified second reference speed, the variation of the command value curves is stopped, and the respective command values of the engine revolutions, the engaging force of the forward clutch and reverse clutch and the braking force of the brake are determined on the basis of the final command value curves. Accordingly, the increase of the driving force to a value that is greater than necessary contrary to the intention of the accelerator operation of the operator following the starting of the vehicle into motion can be prevented. As a result, there is no discrepancy between the operating feeling of the operator and the actual vehicle speed, so that the operability during starting is good.

DESCRIPTION OF THE PREFERRED EMBODIMENTS

An embodiment of the present invention will be described in detail below with reference to the attached figures.

Figure 1:
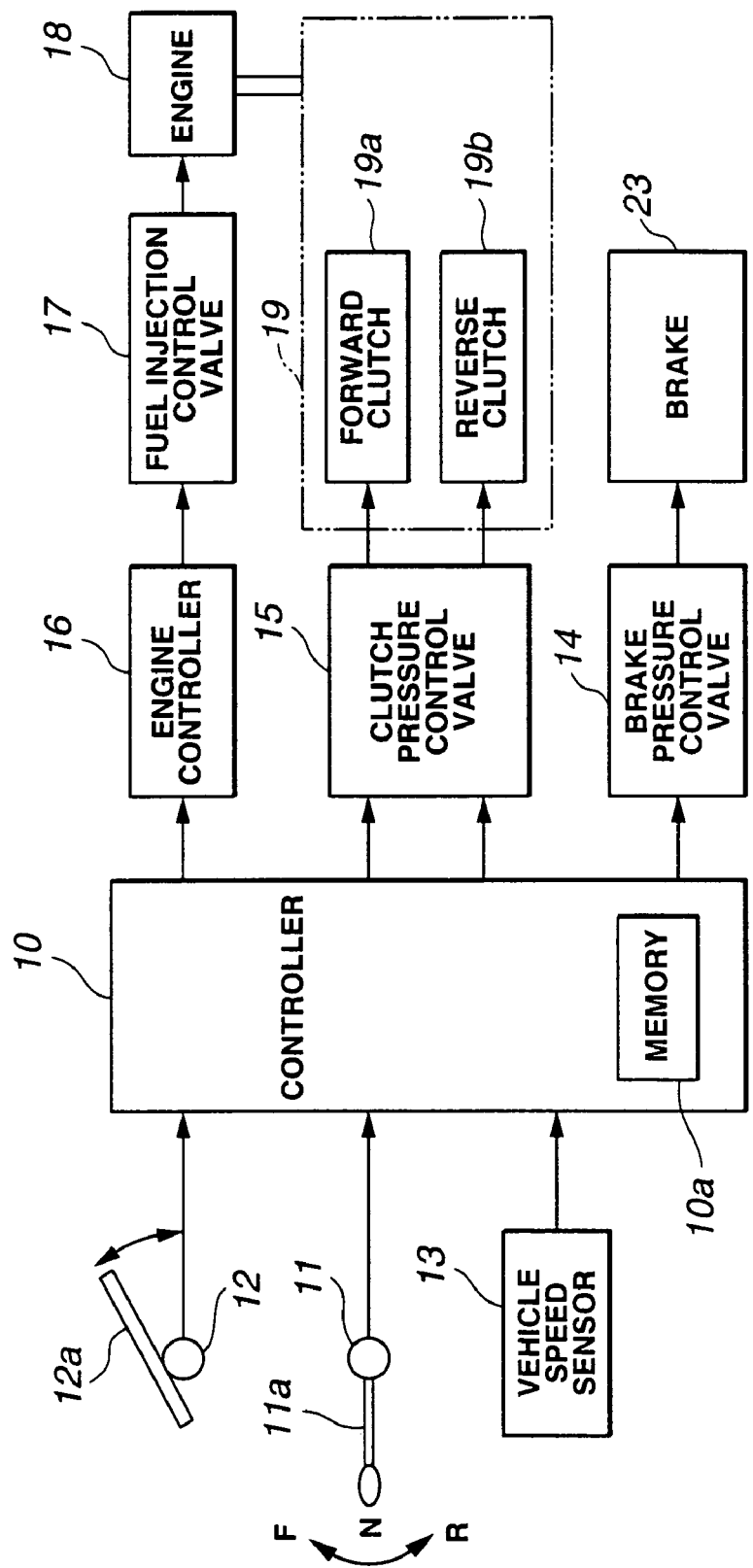
FIG. 1 is a structural block diagram of a running control device constituting an embodiment of the present invention.

FIG. 1 is a structural block diagram of a running control device constituting an embodiment of the present invention; the construction of this running control device will be described with reference to FIG. 1.

The forward-reverse selected direction detection sensor 11 detects whether the direction of travel selected by the forward-reverse selection means 11a (e.g., forward-reverse lever or the like) that switch between forward and reverse is the forward direction, reverse direction or neutral, and outputs a detection signal indicating this to the controller 10. For example, this forward-reverse selected direction detection sensor 11 comprises a limit switch, proximity switch or the like.

The operation amount detection sensor 12 detects the amount of operation of accelerator means such as an accelerator pedal 12a, accelerator lever (not shown in the figures) or the like (hereafter referred to as the "operation amount"), and outputs this amount to the controller 10. For example, the operation amount detection sensor 12 comprises a potentiometer or the like that detects the rotational angle of the abovementioned accelerator pedal 12a or accelerator lever.

The vehicle speed sensor 13 detects the vehicle speed and direction of travel of the industrial vehicle (forklift or the like), and outputs a vehicle speed signal and travel direction signal to the controller 10. This vehicle speed sensor 13 is a sensor which is attached to the axle on which the wheels of the vehicle are mounted, or to the propeller shaft or the like, and which can detect the direction and the number of rotation of this axle or propeller shaft even at extremely low speeds; for example, this sensor is constructed from an electromagnetic pickup sensor, pulse encoder or the like.

Furthermore, the abovementioned electromagnetic pickup sensor is constructed, for example, from a sensor in which a Hall IC is disposed between a permanent magnet and a magnetic circuit forming member (ordinarily made of iron) that is disposed facing this permanent magnet. Two such sensors are disposed in the vicinity of the outer circumferential part of an iron gear disposed on a rotating part of the object of vehicle speed detection so that these sensors are shifted in phase by 90° in the direction of rotation. Then, when the magnetic field that is formed between the permanent magnets and magnetic circuit forming members inside the two sensors varies with the rotation of the gear of the rotating part, the phase and magnitude of the variation in the magnetic field is detected by the Hall IC for each of the sensors, so that the rotational angle and direction of rotation of the gear can be detected. In other words, the rotational angle can be detected even at an extremely low speed.

Furthermore, a transmission 19 is connected to the output shaft of the engine 18, and the output motive force of this transmission 19 is transmitted via a propeller shaft and differential to the left and right vehicle wheels that are respectively attached to the front and rear axles of the vehicle. Brakes 23 are respectively mounted on the rear vehicle wheels, and the brake pressure (braking force) of these brakes 23 is controlled via a brake pressure control valve 14 that receives brake pressure control commands from the controller 10.

Furthermore, a forward clutch 19a and reverse clutch 19b are disposed inside the transmission 19, and switching between forward and reverse travel is performed by these respective clutches. Furthermore, for example, respective speed stage clutches for a first speed, second speed and third speed may be disposed inside the transmission 19, and the system may be devised so that the switching of the respective speed stages is accomplished by the operation of a speed stage selection lever not shown in the figures. The clutch pressure (engaging force) of these respective clutches is controlled via a clutch pressure control valve 15 which receives clutch pressure control commands from the controller 10.

Furthermore, the revolutions of the engine 18 is controlled via a fuel injection control valve 17 by an engine controller 16 that receives revolution commands from the controller 10. The engine controller 16 is constructed from a computer such as a microcomputer or the like.

The controller 10 is constructed from a computer such as a microcomputer or the like; this controller 10 inputs the detection signals of the respective sensors 11, 12 and 13, performs specified control processing (as will be described in detail later) on the basis of these detection signals, and simultaneously controls the braking force of the brakes 23, the engaging force of the respective clutches 19a and 19b of the transmission 19 (i.e., the transmitted driving force) and the revolutions of the engine 18 in a cooperative manner in accordance with the operation amount, so that the driving torque is controlled to an optimal value. As a result, regardless of the angle of inclination of the road surface (sloping road surface, road surface with projections and indentations or the like) on which the vehicle may be present, the vehicle can be started into motion on a sloping road surface without any slipping of the vehicle in the opposite direction; furthermore, the vehicle can also perform operations such as riding over step parts on the road surface at a very low speed, stopping in place and the like, so that such driving operations are greatly facilitated.

Figure 2:
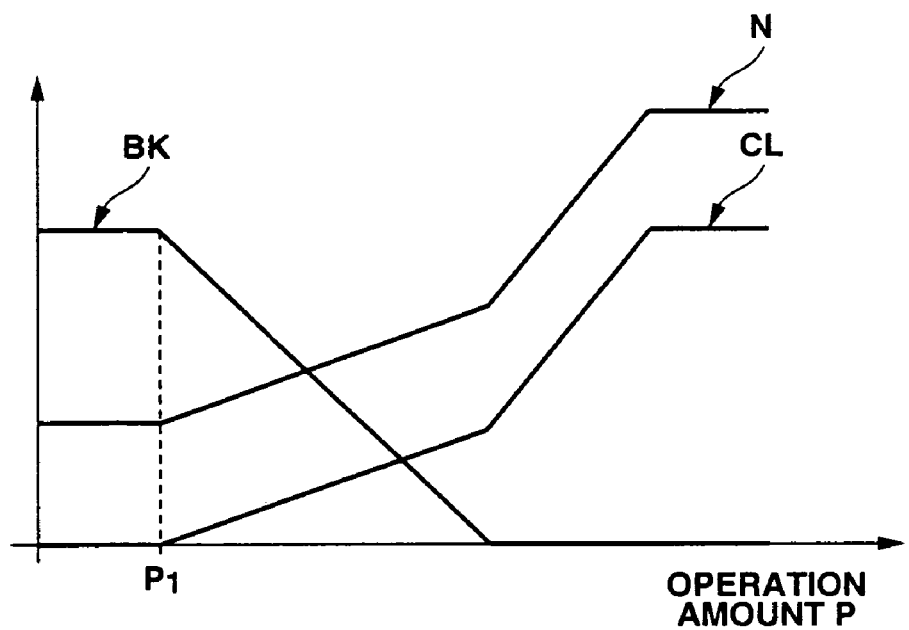
FIG. 2 shows examples of the characteristics of the respective command value curves corresponding to the operation amount of accelerator means in the present invention.

Furthermore, the controller 10 has a memory 10a, and command value curves used to determine the respective command values for the brake pressure, clutch pressure and engine revolutions corresponding to the operation amount P as shown in FIG. 2 are stored in the memory 10a. Furthermore, these command value curves may also be stored in memory in the form of tables or as specified functional equations relating to the operation amount P. The relationships of these respective command values for the brake pressure, clutch pressure and engine revolutions to the operation amount (here, the amount by which the accelerator pedal 12a is depressed) are set so that smooth starting into motion, running control at very low speeds and stopping of the vehicle at very low speeds are possible merely by operating the accelerator means, i.e., even without simultaneous operation of the accelerator means and the brake pedal or brake lever. Specifically, when the operation amount P exceeds a specified operation amount P1, the brake pressure BK is gradually reduced, and the clutch pressure CL and engine revolutions N are gradually increased, in accordance with the operation amount P. Here, when the driving torque in the direction of travel selected by the forward-reverse selection means 11a that is produced by a synthesis of the braking torque generated by the brakes 23, the engine driving torque that is transmitted via the engagement (including slipping) of the forward clutch 19a or reverse clutch 19b corresponding to the abovementioned direction of travel, and the downhill torque along the road surface generated by the load of the vehicle on a road surface that has a slope or step parts, exceeds the torque in the braking direction (determined on the basis of the respective directions of action and magnitudes of the torques), the vehicle begins to move in the abovementioned direction of travel.

Figure 3:
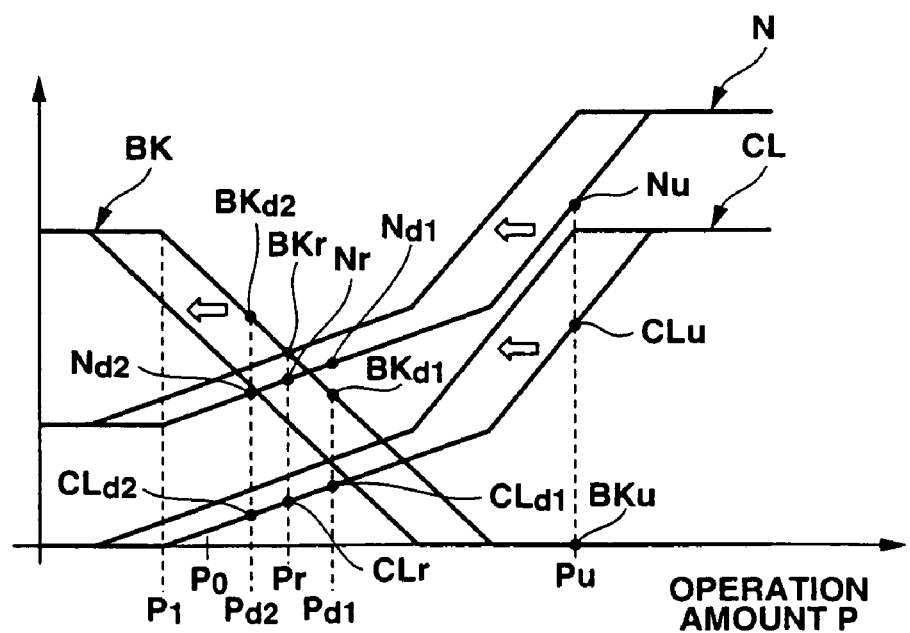
FIG. 3 is an explanatory diagram of the shifting of the respective command value curves in the present invention.

One of the features that is peculiar to the running control method of the present invention is that the command value curves are shifted, at a specified speed, in the direction of a smaller operation amount P as shown in FIG. 3 when the operation amount P exceeds a specified operation amount P0 (>P1). Specifically, a control action is performed so that at the same operation amount P, the brake pressure BK is gradually reduced along a specified slope, and the clutch pressure CL and engine revolutions N are gradually increased along respective specified slopes.

Figure 4:
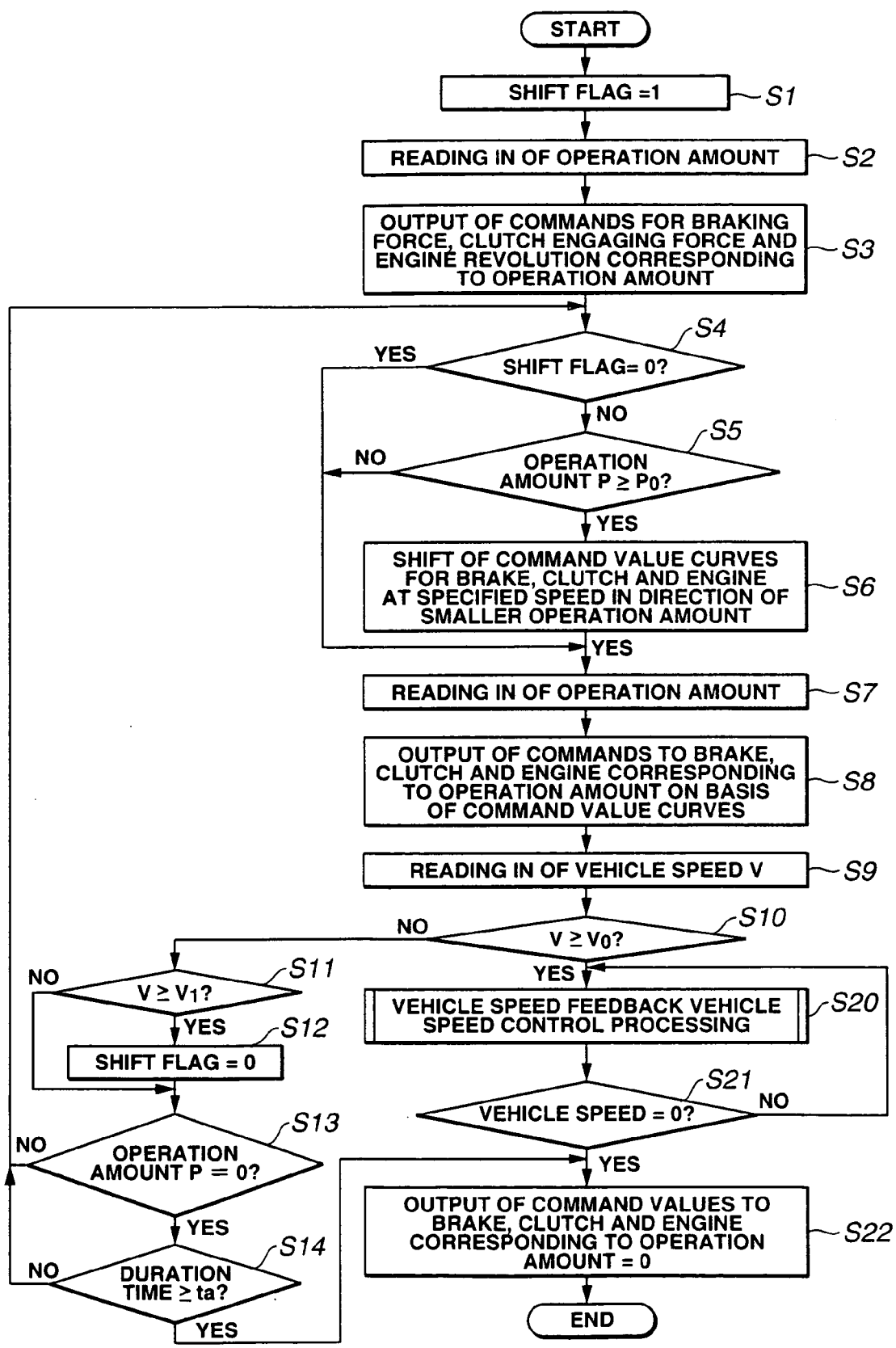
FIG. 4 is a control flow chart of the embodiment.

The control processing procedure performed by the running control device constructed as described above will be described with reference to the flow chart shown in FIG. 4.

First, in step S1, initialization for the following control processing (here, setting of the shift flag at 1 and the like) is performed. Next, in step S2, the operation amount P detected by the operation amount detection sensor 12 is read in, and in step S3, the respective command values for the brake pressure BK, clutch pressure CL and engine revolutions N corresponding to this read-in operation amount P are determined from the command value curves and output. Next, in step S4, a check is made in order to ascertain whether or not the abovementioned shift flag has been cleared to 0. When the shift flag has not been cleared (i.e., is not 0), a check is made in step S5 in order to ascertain whether or not the abovementioned read-in operation amount P is equal to or greater than a specified operation amount P0. Then, when the operation amount is equal to or greater than the specified operation amount P0, the respective command value curves of the brake pressure BK, clutch pressure CL and engine revolutions N are shifted in the direction of a small operation amount P in step S6. The shift processing of these respective command value curves is performed by specified amounts of $\Delta\alpha$, $\Delta\beta$ and $\Delta\gamma$ for each specified calculation period $\Delta t$. Subsequently, after the operation amount P detected by the operation amount detection sensor 12 is read in step S7, the respective command values for the brake pressure BK, clutch pressure CL and engine revolutions N corresponding to this read-in operation amount P are determined and output on the basis of the command value curves (including curves that have been subjected to shift processing and curves that have not been subjected to shift processing) in step S8.

Furthermore, when the shift flag has been cleared (i.e., is 0) in step S4, or in cases where the read-in operation amount P is not equal to or greater than the specified operation amount in step S5, the processing jumps to the abovementioned step S7.

Next, in step S9, the vehicle speed V detected by the vehicle speed sensor 13 is read in, and in step S10, a check is made as to whether or not this vehicle speed V is equal to or greater than a specified first reference speed V1. When the vehicle speed is smaller than the first reference speed V0, a further check is made in step S11 as to whether or not this vehicle speed V is equal to or greater than a second reference speed V1 (V1<V0). If the vehicle speed is equal to or greater than the second reference speed V1, then the shift flag is cleared (i.e., set at 0) in step S12, and the processing is shifted to step S13. Furthermore, when the vehicle speed is smaller than the second reference speed V1 in step S11, the processing is shifted to step S13.

Next, in step S13, a check is made as to whether or not the current read-in operation amount P is zero. When this operation amount is zero, in step S14, the duration time for which this operation amount P is zero is measured, and if the measured duration time is equal to or greater than a specified time ta, it is judged that the operation of starting into motion on the basis of the operation amount has been completed, and the processing proceeds to step S22. When the current operation amount P is not zero in step S13, or when the duration time for which the current operation amount P is zero is shorter than the specified time ta in step S14, the processing returns to step S4, and the abovementioned processing is repeated.

If the vehicle speed V is equal to or greater than the first reference speed V0 in step S10, control at the target vehicle speed corresponding to the operation amount (such as speed feedback vehicle speed control processing or the like) is subsequently executed in step S20. This speed feedback vehicle speed control processing is processing in which the deviation value from the target vehicle speed according to the operation amount is determined with the vehicle speed V detected by the vehicle speed sensor 13 as a feedback value, and the respective command values for the engine revolutions, brake pressure BK and clutch pressure CL are calculated and output so that this deviation value is reduced, thus adjusting the vehicle speed to the target vehicle speed. Accordingly, in this vehicle speed control processing, tracking control to the target vehicle speed is accomplished by controlling the engine driving torque or engine braking torque in accordance with the conditions of the road surface, and simultaneously controlling the braking torque of the brakes and the clutch engagement torque or the like.

Next, in step S21, the actual vehicle speed V detected by the vehicle speed sensor 13 is monitored, and the speed feedback vehicle speed control of step S20 is continued until this actual vehicle speed V reaches zero, i.e., until the vehicle stops. Subsequently, once the vehicle has stopped, the speed feedback vehicle speed control is ended in step S22, and the respective command values for the brake pressure BK, clutch pressure CL and engine revolutions N corresponding to an operation amount P equal to zero in the command value curves shown in FIG. 2 are output.

The operations performed in the case of uphill operation and downhill operation using the abovementioned construction will be described next.

Figure 5:
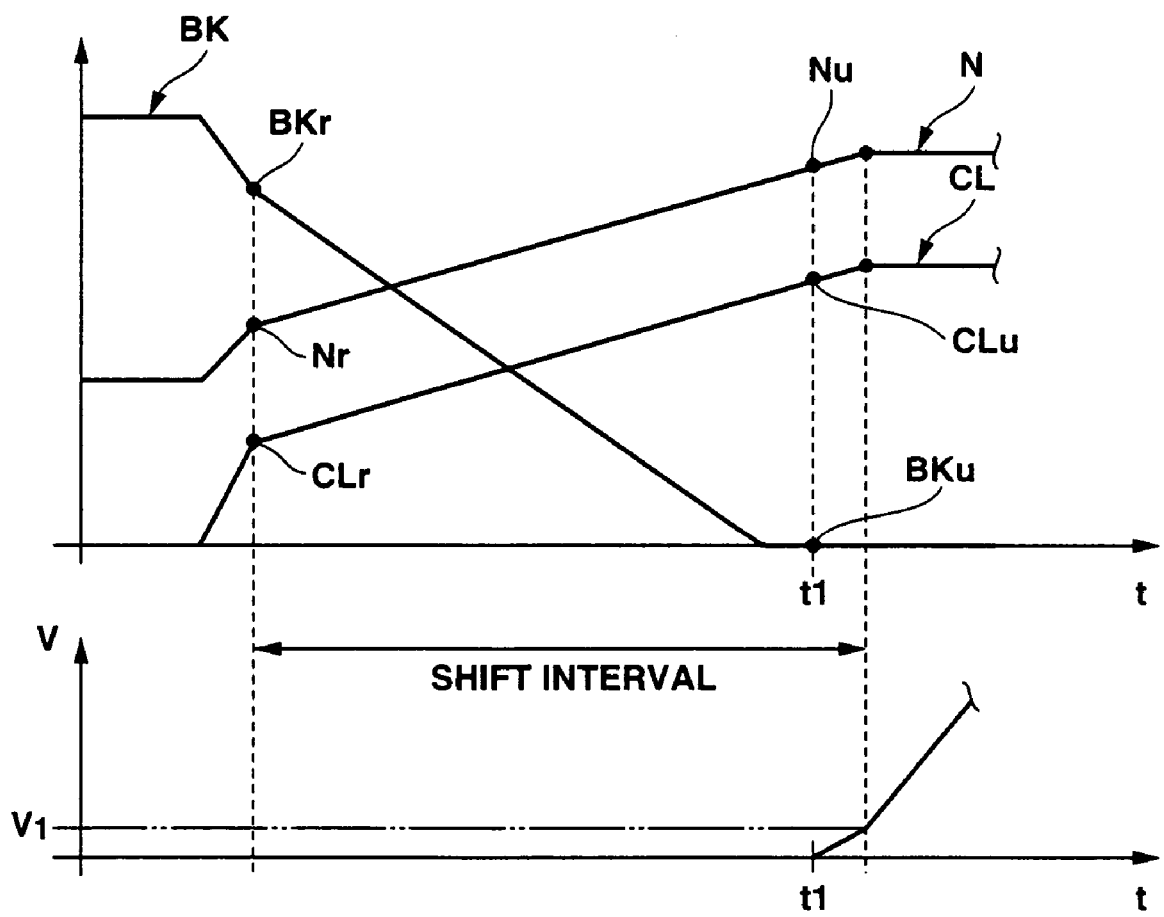
FIG. 5 is a timing chart of the respective command values during uphill operation illustrating the operation of the present invention.

FIG. 5 is a timing chart of the respective command values used in the case of uphill operation. Here, it is assumed that the forward direction has been selected by the forward-reverse selection means 11a while the vehicle is stopped at an intermediate point on an uphill slope, that the accelerator means have been operated to the operation amount Pr (>P0) shown in FIG. 3, and that this operation amount Pr has been held. In this case, the respective command values BKr, CLr and Nr for the brake pressure BK, clutch pressure CL and engine revolutions N corresponding to this operation amount Pr are first determined and output on the basis of the command value curves stored beforehand in memory (steps S2 and S3). However, in this output state, since a driving force of the specified magnitude required for starting into motion in the case of uphill operation (for example, this driving force is the uphill force depending on the respective command values of the brake pressure BKu, clutch pressure CLu and engine revolutions Nu corresponding to the operation amount Pu on an uphill slope having a specified angle of inclination as shown in FIG. 3) is not obtained, the vehicle does not start into motion.

Next, since the operation amount Pr in this case is equal to or greater than the specified operation amount P0, the respective command value curves of the brake pressure BK, clutch pressure CL and engine revolutions N are shifted in the direction of a smaller operation amount P as indicated by the arrows in FIG. 3 (steps S5 and S6). As a result, the respective command values on the command value curves corresponding to the abovementioned held operation amount Pr behave as follows: the brake pressure is gradually reduced from BKr, the clutch pressure is gradually increased from CLr, and the engine revolutions are gradually increased from Nr. Accordingly, even though the operation amount Pr is constant, the actual command values gradually vary in accordance with the abovementioned shift as shown in FIG. 5, so that eventually, at time t1, these values respectively reach the brake pressure BKu, clutch pressure CLu and engine revolutions Nu that correspond to the abovementioned operation amount Pu. In this case, the vehicle starts into motion (on an uphill slope); as a result, the vehicle is started into motion at the operation amount of Pr (<Pu). Subsequently, the vehicle is gradually accelerated on the basis of the controlled operation amount, and when the vehicle speed V exceeds the first reference speed V0, speed feedback vehicle speed control processing is executed, so that the vehicle speed is controlled to the target vehicle speed corresponding to the operation amount.

Figure 6:
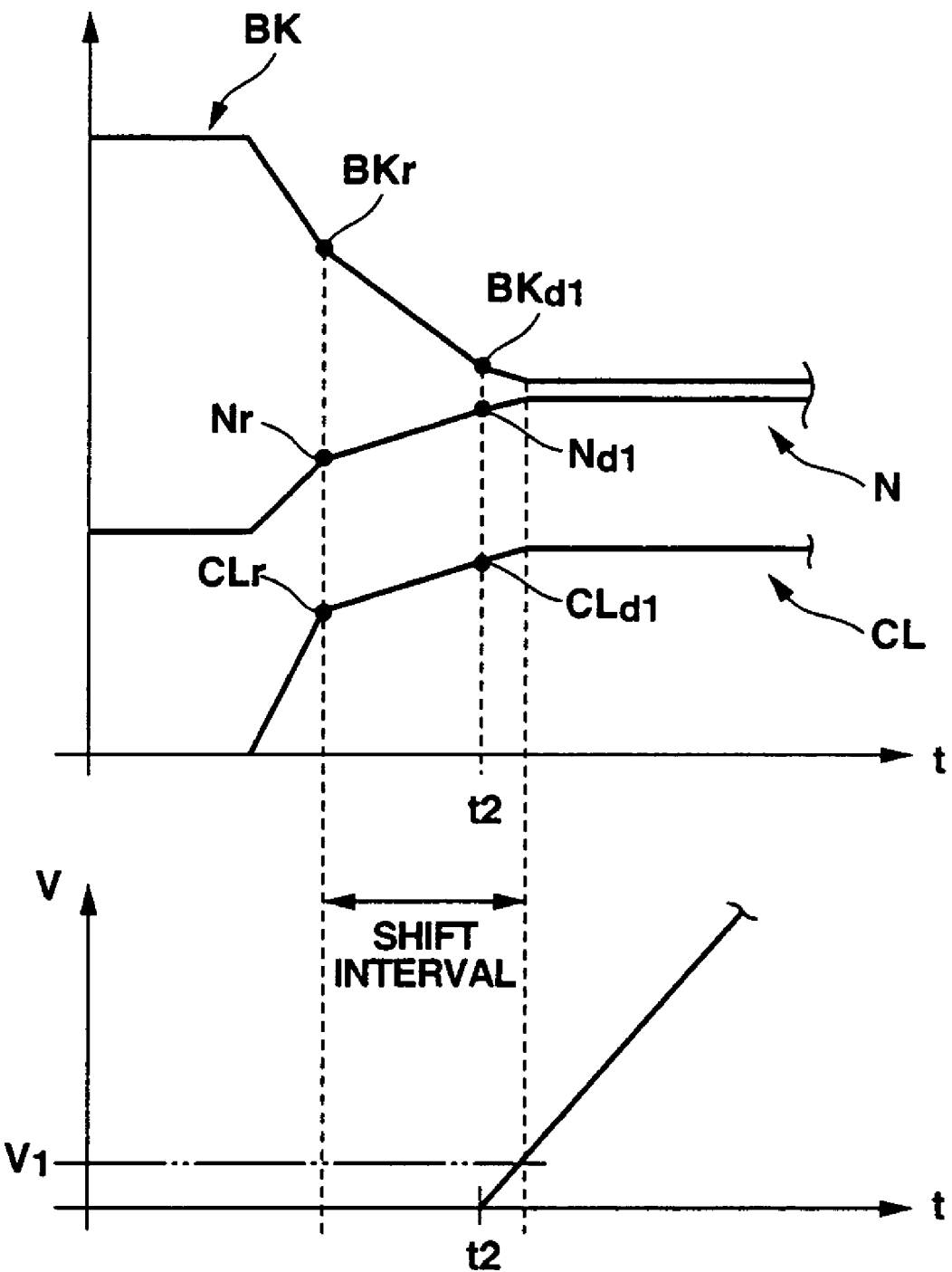
FIG. 6 is a timing chart of the respective command values during downhill operation illustrating the operation of the present invention.

Next, a first example of downhill operation will be described with reference to FIG. 6. FIG. 6 is a timing chart of the respective command values used in downhill operation. Here, it is assumed that the forward direction has been selected by the forward-reverse selection means 11a while the vehicle is stopped at an intermediate point on a downhill slope, that the accelerator means have been operated to the operation amount Pr (>P0) shown in FIG. 3, and that this operation amount Pr has been held. Furthermore, it is assumed that this operation amount Pr is smaller than the operation amount Pd1 that outputs the driving torque required for starting into motion on the abovementioned downhill slope that has a specified gradual angle of inclination (for example, this torque is the torque produced by the respective command values for the brake pressure BKd1, clutch pressure CLd1 and engine revolutions Nd1 shown in FIG. 3).

In this case, the respective command values BKr, CLr and Nr of the brake pressure BK, clutch pressure CL and engine revolutions N corresponding to this operation amount Pr are first determined and output on the basis of the command value curves that have been stored beforehand in memory (steps S2 and S3). However, in this output state, since the specified driving force required for starting into motion on the abovementioned downhill slope is not obtained, the vehicle does not start into motion.

Next, since the operation amount Pr in this case is equal to or greater than the specified operation amount P0, the respective command value curves for the brake pressure BK, clutch pressure CL and engine revolutions N are shifted in the direction of a smaller operation amount P as indicated by the arrows in FIG. 3 (steps S5 and S6). As a result, the respective command values on the command value curves corresponding to the held operation amount Pr behave as follows: the brake pressure is gradually reduced from BKr, the clutch pressure is gradually increased from CLr, and the engine revolutions are gradually increased from Nr. Accordingly, even though the operation amount Pr is constant, the actual command values gradually vary in accordance with the abovementioned shift as shown in FIG. 6, and eventually, at time t2, these values respectively reach the brake pressure BKd1, clutch pressure Cld1 and engine revolutions Nd1 corresponding to the operation amount Pd1. In this case, the vehicle starts into motion (on a downhill slope); as a result, the vehicle is started into motion at the operation amount Pr (<Pd1). Subsequently, the vehicle is gradually accelerated on the basis of the controlled operation amount, and when the vehicle speed V exceeds the first reference speed V0, speed feedback vehicle speed control processing is executed, so that the vehicle speed is controlled to the target vehicle speed corresponding to the operation amount.

Figure 7:
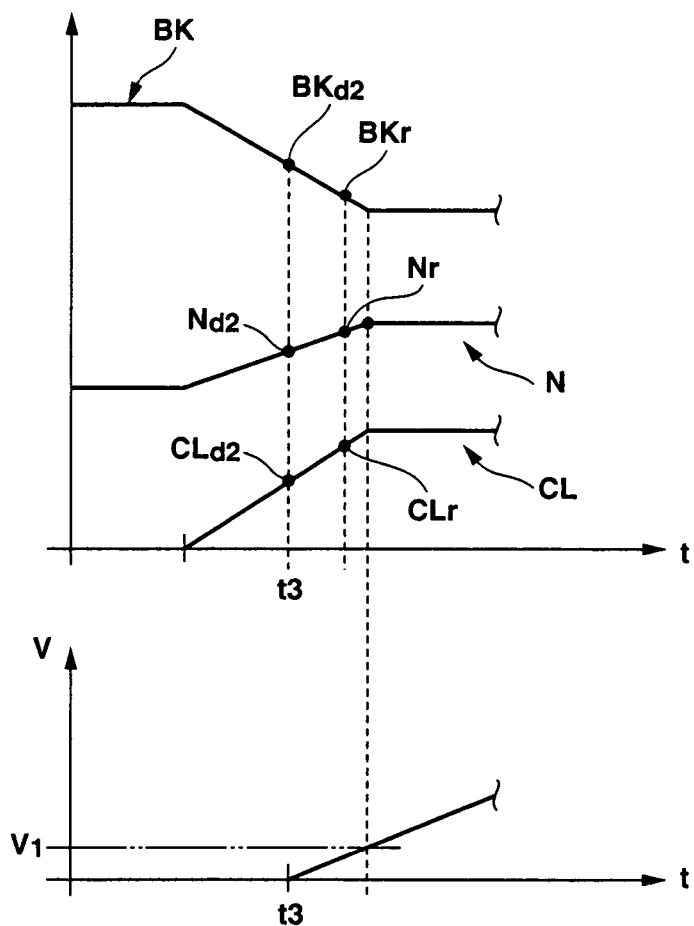
FIG. 7 is a timing chart of the respective command values during downhill operation illustrating the operation of the present invention.
Figure 8:
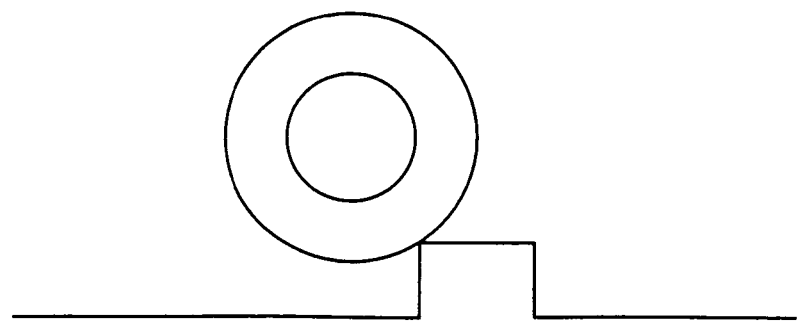
FIG. 8 is an explanatory diagram of starting into motion on a step part of the road surface in the prior art.

Furthermore, a second example of downhill operation will be described with reference to FIG. 7. FIG. 7 is a timing chart of the respective command values used in the case of downhill operation. Here as well, it is assumed that the forward direction has been selected by the forward-reverse selection means $11a$ while the vehicle is stopped at an intermediate point on a downhill slope, that the accelerator means have been operated to the operation amount Pr (>P0) shown in FIG. 3, and that this operation amount Pr has been held. Furthermore, it is assumed that this operation amount Pr is greater than the operation amount Pd2 that outputs the driving torque required for starting into motion on the downhill slope that has a specified steep angle of inclination (for example, this torque is the torque produced by the respective command values for the brake pressure BKd2, clutch pressure CLd2 and engine revolutions Nd2 shown in FIG. 3).

First, the respective command values BKr, CLr and Nr for the brake pressure BK, clutch pressure CL and engine revolutions N corresponding to this operation amount Pr are determined and output on the basis of the command value curves stored beforehand in memory (steps S2 and S3). However, the driving torque required for starting into motion on this downhill slope (this torque corresponds to the torque generated by the respective command values for the brake pressure BKd2, clutch pressure CLd2 and engine revolutions Nd2) is (for example) output in the case of a small operation amount Pd2 that precedes the abovementioned operation amount Pr as shown in FIG. 3. Accordingly, as is shown in FIG. 7, the vehicle starts into motion on the downhill slope at the point in time t3 preceding the operation to the abovementioned operation amount Pr. As a result, the vehicle starts into motion at an amount of operation that is slightly smaller than the operation amount Pr. Subsequently, when the vehicle speed V exceeds the first reference speed V0, speed feedback vehicle speed control processing is executed, so that the vehicle speed is controlled to the target vehicle speed corresponding to the operation amount.

Furthermore, the construction of the abovementioned embodiment is not limited to the construction described above; other constructions may also be used as long as these constructions are capable of achieving the object of the present invention.

For instance, an example using hydraulic brakes and hydraulic clutches was described; however, it would also be possible to use electromagnetic brakes and electromagnetic clutches or the like.

Furthermore, the operation amount detection sensor 12 is not limited to a rotary type potentiometer; it would also be possible to use a linear position sensor or the like.

Moreover, the controller 10 and engine controller 16 were constructed separately; however, it would also of course be possible to use a construction in which both of these controllers are combined into a single controller.

Furthermore, the machinery to which the present invention is applied is not limited to industrial vehicles such as the forklift or the like indicated in the embodiment; the present invention may also be applied to other industrial vehicles, e.g., construction machinery such as wheel loaders, bulldozers or the like.

As was described above, the present invention offers the following merits:

Since the present invention is devised so that the engine revolutions, braking force of the brakes and engaging force of the forward clutch and reverse clutch are simultaneously controlled in a cooperative manner in accordance with the amount of operation of the accelerator means, the vehicle can be started into motion at a very low speed and without any slipping in the opposite direction by operating only the accelerator means, without performing three simultaneous operations (as is necessary in conventional devices) when the vehicle is started into motion on a road surface that has a slope or steps. Accordingly, the operability can be greatly improved, and workability can be greatly improved by using this industrial vehicle. Furthermore, since the engine revolutions, braking force of the brakes and clutch engaging force are simultaneously controlled in a cooperative manner, starting into motion, running and stopping at a very low speed on slopes or the like can easily be accomplished, so that collapse or spilling of the load can be prevented, thus providing good workability.

Furthermore, even in cases where the conditions of the road surface such as the angle of inclination and the like are different, as long as the operator operates the vehicle at a specified operation amount, the controller will automatically and simultaneously vary the command value curves for the engine revolutions, braking force of the brakes and engaging force of the forward clutch and reverse clutch, and will thus perform a control action so that the driving torque generated by these forces gradually increases, so that the vehicle can easily be started into motion. Accordingly, there is no need to vary the operation amount (amount of depression of the accelerator pedal or the like) in accordance with the conditions of the road surface such as the angle of inclination of a sloping road surface or the like, and the operator can easily start the vehicle into motion by always holding substantially the same operation amount. Consequently, the vehicle can always be started into motion with the same operating feeling, so that the operability can be improved.

After the vehicle starts into motion, the driving torque is controlled by simultaneously controlling the engine revolutions, the engaging force of the forward clutch and reverse clutch and the braking force of the brakes in accordance with the operation amount until the vehicle speed rises to a speed that is equal to or greater than a first reference speed. Accordingly, starting of the vehicle into motion can be easily and reliably accomplished, and the vehicle speed can be reliably increased. Furthermore, once the vehicle speed has risen to a speed that is equal to or greater than the abovementioned first reference speed, the simultaneous control of the engine revolutions, braking force of the brakes and clutch engaging force is stopped; accordingly (for example), a more mobile running control such as vehicle speed control in accordance with the operation amount or the like can be executed.

Furthermore, when the vehicle speed exceeds a specified second reference speed (which is less than the first reference speed), the variation of the command value curves is stopped, and the respective command values for the engine revolutions, the engaging force of the forward clutch and reverse clutch and the braking force of the brakes are determined on the basis of the final command value curves; accordingly, an increase in the driving force to a force that is greater than necessary contrary to the intent of the accelerator operation performed by the operating after the vehicle starts into motion can be prevented. As a result, there is no discrepancy between the operating feeling of the operator and the actual vehicle speed, so that the operability is good.

What is claimed is:

1. A running control device for an industrial vehicle comprising:
   an engine;
   an operation amount detection sensor which detects an operation amount of accelerator means for controlling engine revolutions;
   a transmission which has a forward clutch and reverse clutch that respectively switch a direction of travel of the vehicle to a forward direction and reverse direction, and which transmits a driving torque of the engine to driving wheels via the forward clutch or reverse clutch;
   a brake which applies braking to the vehicle; and
   a controller which controls an engaging force of the forward clutch and reverse clutch and a braking force of the brake during the running of the vehicle, and which controls the engine revolutions on the basis of the operation amount detected by the operation amount detection sensor;
   wherein the controller simultaneously controls the engine revolutions, the engaging force of the forward clutch and reverse clutch and the braking force of the brake, on the basis of the operation amount detected by the operation amount detection sensor, and
   wherein when the operation amount detected by the operation amount detection sensor exceeds a specified operation amount, the braking force of the brake is gradually decreased and the engaging force of the clutch and the engine revolutions are gradually increased, in accordance with the detected operation amount.

2. The running control device for an industrial vehicle according to claim 1, wherein a vehicle speed sensor that detects a vehicle speed is provided, and the controller further stops, on the basis of the operation amount, the simultaneous control of the engine revolutions, the engaging force of the forward clutch and reverse clutch and the braking force of the brake when the vehicle speed detected by the vehicle speed sensor exceeds a specified first reference speed.

3. The running control device for an industrial vehicle according to claim 2, wherein, the controller varies command value curves of the engine revolutions, the engaging force of the forward clutch and reverse clutch and the braking force of the brake that correspond to the operation amount so that the vehicle driving force generated by the engine revolutions, the engaging force of the forward clutch and reverse clutch and the braking force of the brake that correspond to the operation amount increases when the operation amount exceeds a specified value, and determines and outputs respective command values for the engine revolutions, the engaging force of the forward clutch and reverse clutch and the braking force of the brake that correspond to the operation amount on the basis of the command value curves following the variation.

4. The running control device for an industrial vehicle according to claim 3, wherein the controller stops the variation of the command value curves when the vehicle speed exceeds a specified second reference speed, holds final command value curves, and determines the respective command values on the basis of the final command value curves.

5. A running control device for an industrial vehicle comprising:
   an engine;
   an operation amount detection sensor which detects an operation amount of accelerator means for controlling engine revolutions;
   a transmission which has a forward clutch and reverse clutch that respectively switch a direction of travel of the vehicle to a forward direction and reverse direction, and which transmits a driving torque of the engine to driving wheels via the forward clutch or reverse clutch;
   a brake which applies braking to the vehicle; and
   a controller which controls an engaging force of the forward clutch and reverse clutch and a braking force of the brake during the running of the vehicle, and which controls the engine revolutions on the basis of the operation amount detected by the operation amount detection sensor;
   wherein the controller simultaneously controls the engine revolutions, the engaging force of the forward clutch and reverse clutch and the braking force of the brake, on the basis of the operation amount detected by the operation amount detection sensor, and the controller varies command value curves of the engine revolutions, the engaging force of the forward clutch and reverse clutch and the braking force of the brake that correspond to the operation amount so that the vehicle driving force generated by the engine revolutions, the engaging force of the forward clutch and reverse clutch and the braking force of the brake that correspond to the operation amount increases when the operation amount exceeds a specified value, and determines and outputs respective command values for the engine revolutions, the engaging force of the forward clutch and reverse clutch and the braking force of the brake that correspond to the operation amount on the basis of the command value curves following the variation.

6. The running control device for an industrial vehicle according to claim 5, wherein the controller stops the variation of the command value curves when the vehicle speed exceeds a specified second reference speed, holds final command value curves, and determines the respective command values on the basis of the final command value curves.

* * * * *